Sept. 11, 1951 S. J. LEVY 2,567,908

RADIO CARRIER ALARM SYSTEM

Filed July 31, 1947 8 Sheets-Sheet 1

Fig.1, Fig.3,

INVENTOR
SOL J. LEVY
BY
Pennie, Edmonds, Morton & Barrows.
ATTORNEYS

Sept. 11, 1951 S. J. LEVY 2,567,908

RADIO CARRIER ALARM SYSTEM

Filed July 31, 1947 8 Sheets-Sheet 2

INVENTOR
SOL J. LEVY
BY
Pennie, Edmonds, Morton & Barrows.
ATTORNEYS

Sept. 11, 1951 S. J. LEVY 2,567,908

RADIO CARRIER ALARM SYSTEM

Filed July 31, 1947 8 Sheets-Sheet 3

INVENTOR
SOL J. LEVY
BY Pennie, Edmonds, Morton and Barrows.
ATTORNEYS

Sept. 11, 1951 S. J. LEVY 2,567,908
RADIO CARRIER ALARM SYSTEM
Filed July 31, 1947 8 Sheets-Sheet 4
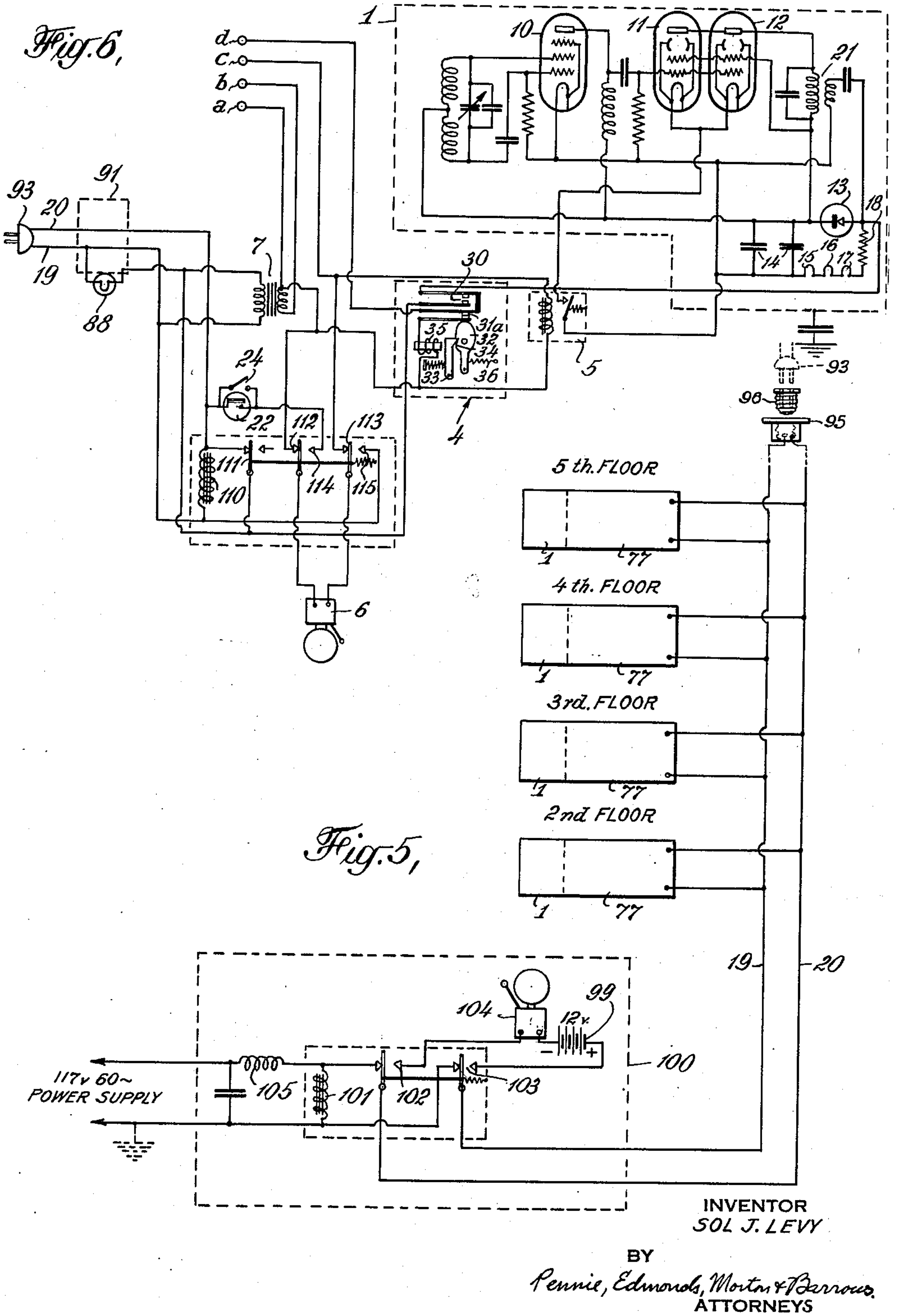
Fig. 6, Fig. 5,
INVENTOR
SOL J. LEVY
BY
Pennie, Edmonds, Morton & Barrows
ATTORNEYS Sept. 18, 1951 S. J. LEVY 2,567,908

RADIO CARRIER ALARM SYSTEM

Filed July 31, 1947 8 Sheets-Sheet 5

INVENTOR
SOL J. LEVY
BY Pennie, Edmonds, Morton and Barrows.
ATTORNEYS

Sept. 11, 1951 S. J. LEVY 2,567,908

RADIO CARRIER ALARM SYSTEM

Filed July 31, 1947 8 Sheets-Sheet 6

INVENTOR
SOL J. LEVY
BY Pennie, Edmonds, Morton and Barrows.
ATTORNEYS

Sept. 11, 1951 S. J. LEVY 2,567,908

RADIO CARRIER ALARM SYSTEM

Filed July 31, 1947 8 Sheets-Sheet 7

INVENTOR.
SOL J. LEVY

BY

Pennie, Edmonds, Morton & Barrows.
ATTORNEYS

RADIO CARRIER ALARM SYSTEM
Filed July 31, 1947 8 Sheets-Sheet 8
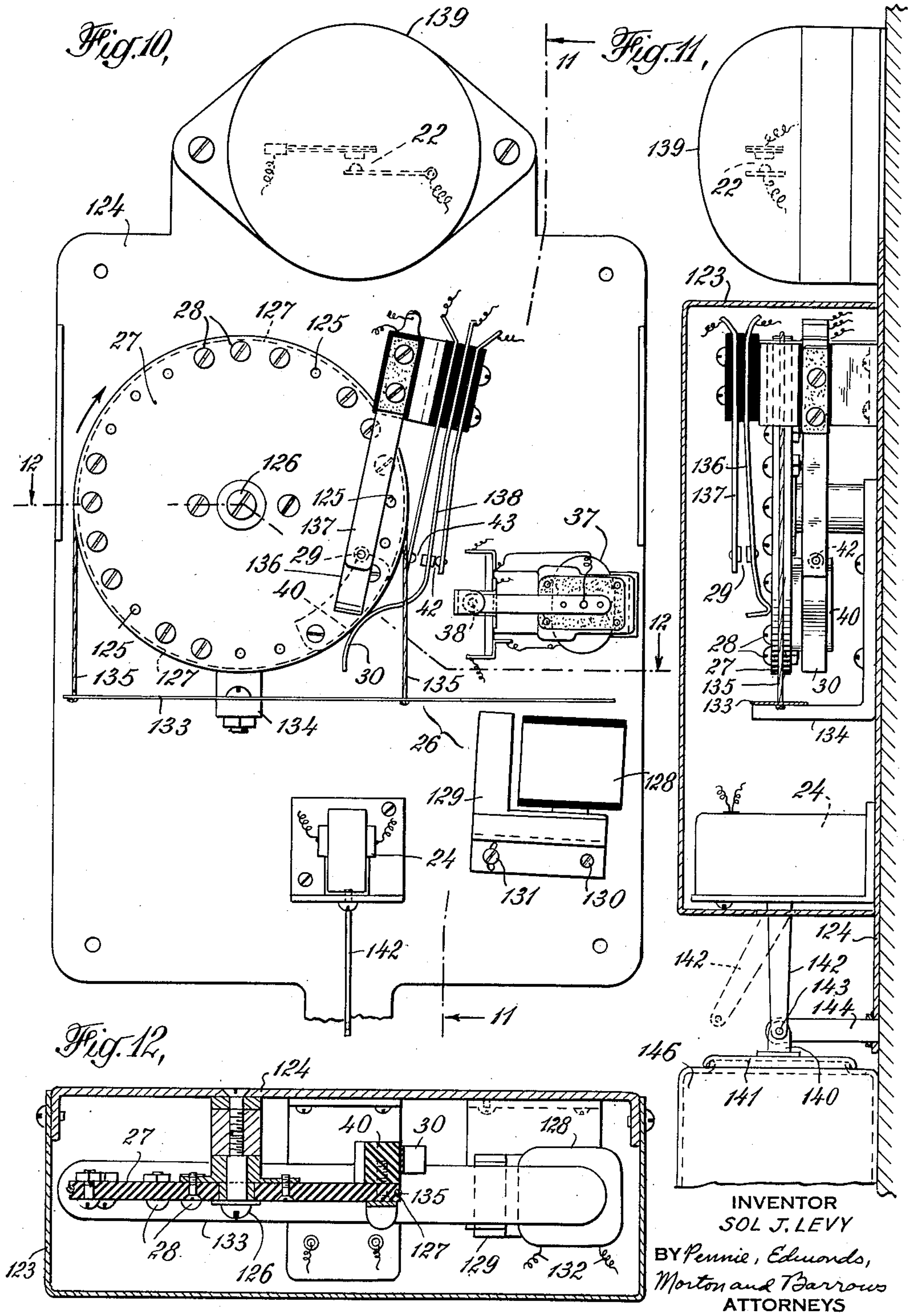
Fig. 10, Fig. 11, Fig. 12,
INVENTOR
SOL J. LEVY
BY Pennie, Edmonds, Morton and Barrows
ATTORNEYS Patented Sept. 11, 1951 2,567,908

UNITED STATES PATENT OFFICE 2,567,908

RADIO CARRIER ALARM SYSTEM

Sol J. Levy, Bradley Beach, N. J., assignor to Monmouth Laboratories, Inc., Bradley Beach, N. J., a corporation of New Jersey Application July 31, 1947, Serial No. 765,004

15 Claims. (Cl. 177—356)

This invention relates to signal distribution systems, and more particularly to detection and alarm systems, such as for the detection of heat rise above normal resulting from the outbreak of a fire, and the transmission of signals indicating the same over a conductor.

More specifically the present invention comprises methods and means for detecting a fire or other condition at any desired location, initiating by the detecting means actuation of a carrier-frequency transmitter which preferably is automatically modulated or coded by means of a coding device preset to identify the location, transmitting the coded signals over a suitable conductor such as a power line, detecting the signals at a receiving point connected to the power line and actuating a signal device by the detected signals. To enhance reliability, the system of the invention may, if desired, include duplicate apparatus for that subject to failure, and battery standby equipment for service or alarm in event of failure of the usual power supply, all under automatic control. The invention also contemplates the automatic operation of fire extinguishing equipment in response to the signals wherever required. Several different modifications and aspects of the invention are included, some of which are especially adapted to other types of alarm systems such as burglar alarms. However, the invention will be described more particularly in its application to fire detection and alarm systems.

Fire detection and alarm systems heretofore proposed have necessitated the exclusive use of special wire distribution systems, both complicated and costly to install. Furthermore, they have been of such nature that installation in a building already constructed has entailed considerable damage to the building and has been so expensive as to be prohibitive in many cases. The system of the present invention, on the other hand, although equally applicable to installations made at the time of construction of the buildings or other structure, is especially adapted to installation in buildings already constructed because the apparatus of this invention is so arranged as to be readily connected in existing wiring in a given structure with substantially no structural changes or damage thereto, and without interfering with the originally intended use of such wiring. Another advantage of the invention resides in its portability or semi-portability, which is not true of any comparable system heretofore available. The simplicity of installation and removal not only permits rapid and cheap installations but also makes feasible temporary installations of fire detection, protection and alarm systems. Thus by the use of this invention it becomes possible, for instance, temporarily or permanently, to house large numbers of persons in buildings not otherwise legally available for such purpose because inadequately protected by fire detecting and alarm systems.

The systems of the present invention have many advantages which will be apparent upon consideration of the following description taken together with the drawings, in which:

Fig. 3 is a circuit diagram of an alternative form of transmitter;

Fig. 5 is a diagram of a battery standby circuit such as may be employed in connection with the alarm system of Fig. 4 when duplicated on several floors of a building;

Fig. 6 is a circuit diagram of a battery standby transmitter system to be substituted for the transmitter of Fig. 1, and arranged for use with one or more coders as in Fig. 1;

Fig. 10 is a plan view of a coder and associated apparatus according to the invention;

Fig. 11 is a sectional view of the mechanism of Fig. 10 taken along line 11—11 of Fig. 10; also including an automatically releasable fire extinguisher; and Fig. 12 is a sectional view taken along line 12—12 of Fig. 10.

Figure 1:
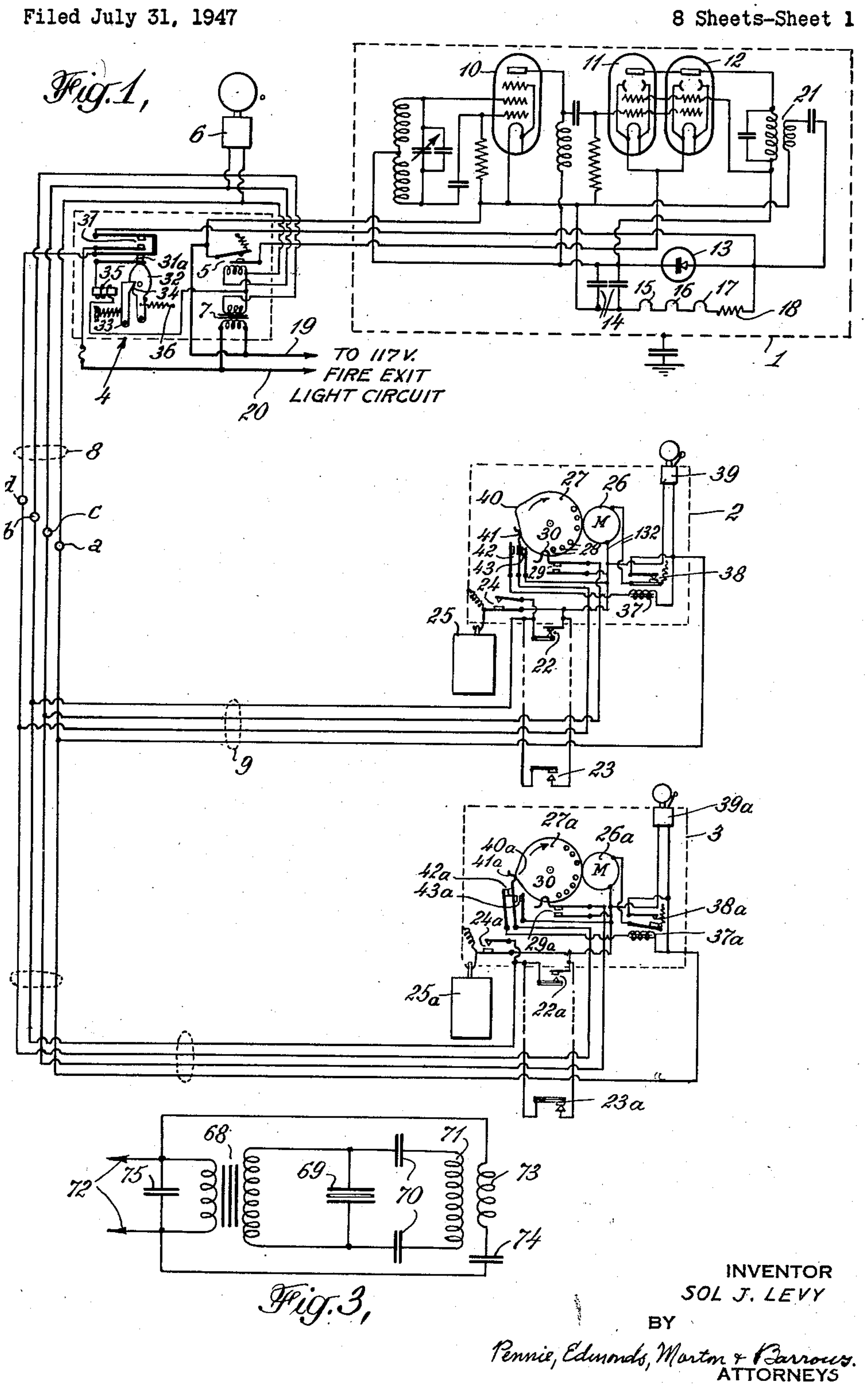
Fig. 1 is a schematic diagram of a transmitter and coding system in accordance with the invention.
Figure 2:
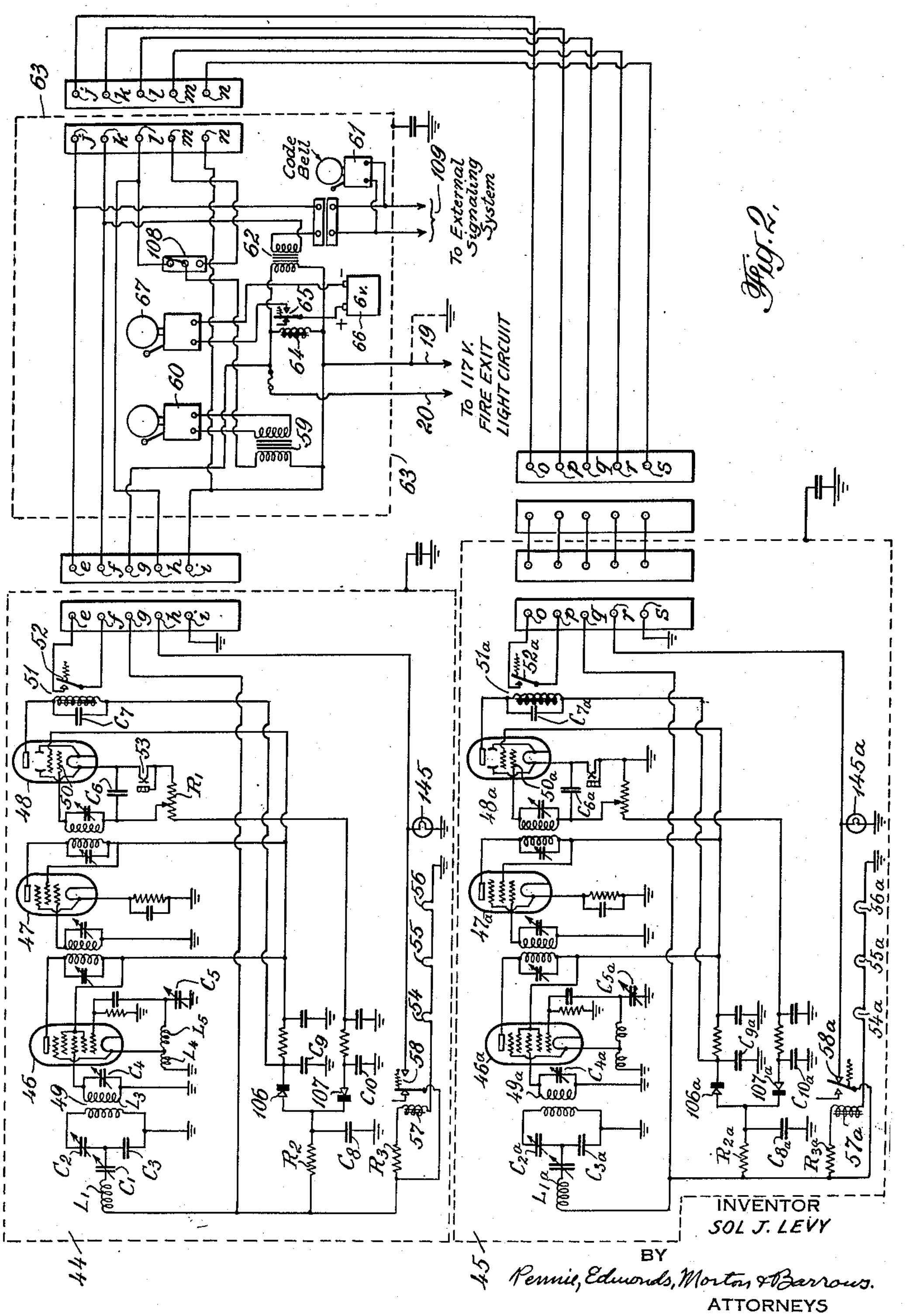
Fig. 2 is a circuit diagram of a receiving portion of the system including duplicate standby apparatus, alarms and automatic controls therefor.

Fig. 1 and Fig. 2 taken together comprise one embodiment of a complete fire detection and alarm system including many of the features of the present invention. It may be understood that the transmitting and receiving portions of the system are connected or coupled together over the circuit marked "To 117V Fire Exit Light Circuit." Although for the purpose of reliability it is preferable that the system be associated with a supervised circuit such as an Underwriters' approved fire exit light circuit, any other electric power circuit or the equivalent would suffice. The frequency of the transmitter is not critical, but should be selected so as not to interfere with the circuits for which the line is normally used. Here, a transmitter frequency of 100 kc. has been selected by way of example.

Referring to Fig. 1 a radio-frequency signal transmitter 1 is shown enclosed in a suitable shielding housing represented by a dotted line. Corresponding housings are represented as enclosing most of the separate portions of the equipment herein illustrated in the drawings, and they would usually be grounded through condensers of suitable capacity.

The transmitter in this instance comprises an oscillator including a tube 10, represented as type 6AK6, connected as an electron-coupled Hartley oscillator of which the output is coupled to two amplifier tubes 11 and 12 which may be of type 50B5. It is desirable that the oscillator be of a type which closely maintains its adjusted frequency with slight variations of line voltage, so that the receiver circuits may be sharply tuned. Any suitable tubes may be employed in the transmitter, the types herein suggested having been selected merely because they have proved satisfactory. The amplifier tubes are connected in parallel in order approximately to double the output of one such tube. Anode and screen-grid potentials are derived from rectifier 13, the output of which is filtered by condensers 14 in the usual manner. The cathode heaters 15, 16 and 17 are connected in the rectifier circuit in series with each other and with a limiting resistor 18, these heaters being respectively associated with tubes 10, 11 and 12. The output signals from transmitter 1 are coupled through output transformer 21 to the two sides of the power lines 19, 20.

The device which initiates the signal to be transmitted is here, as in the usual fire detection and alarm systems, a switch which may be either automatically or manually actuated. Two such switches 22 and 23 are shown associated with coder 2, and two more such switches **22*a* and 23*a* are shown associated with coder 3**. As many switches as required may be connected in parallel. These switches are here represented as being automatic heat-actuated switches usually called thermostats. In many installations for fire protection it is advisable to employ a large number of automatic thermostats placed at locations where the heat from a fire first accumulates, such as near the ceilings of rooms and closets, beneath the upper parts of staircases, etc. The so-called manual switch customarily employed in fire alarm systems actually comprises a spring-actuated switch which is held in open position by pressure of a button against a piece of glass which when manually broken effects automatic closing of the switch.

A novel form of fire alarm switch illustrated in Fig. 1, and which in slightly modified form is again referred to below in connection with Fig. 10, comprises a two-contact spring-closed switch 24 having a hook or lever attached to its movable switch arm. When a container 25 of fire extinguishing fluid is suspended from the hook the switch contacts are held open. If the top of this container is sealed with readily fusible metal, as may here be assumed, a predetermined temperature rise will cause the container to fall from the hook, automatically spilling the fire extinguishing fluid and simultaneously automatically closing the contacts of switch 24 to initiate an alarm signal. On the other hand, the container 25 may be seized by one desiring to extinguish a fire, which act will tear off the top of the container and will likewise automatically result in the closure of the contacts of switch 24, initiating the alarm signal. The switch 24 obviously need not be enclosed within the container 2 as shown, but can be located wherever the fire extinguisher 25 should be placed.

The coding device or coder enclosed within the housing 2 is connected to transmitter 1 causing that transmitter to transmit coded signal pulses. It is intended that these pulses be spaced to comprise a code indicating the location of the point from which the signals originate. For example, in a hotel, code signals might designate floor numbers or room numbers. The mechanical construction of the coder is more fully described in connection with Figs. 10 to 12, but the principle of operation will be understood by reference to Fig. 1 illustrating the circuit connections. The closing of contacts 22, 23 or 24 energizes latch relay 4 through stepdown power transformer 7, closing contacts 31 and opening contacts **31*a* of the relay. This latch relay would have initially been set by hand to the position shown by rotating cam member 32 until the end of latch 33 locks in notch 34 in the cam. Energization of electromagnet 35, as above mentioned, releases latch 33 permitting spring 36 to rotate cam 32, thus closing contacts 31 and opening contacts 31*a***.

The closing of contacts 31 feeds energizing current from the power circuit 19, 20 to the input of transmitter 1 at the junction of resistor 18 and rectifier 13. Hence, the first signal pulse puts the transmitter into operating condition and it so remains until the latch relay is manually reset. The contacts **31*a*, normally closed, are simultaneously opened, thus opening the low-voltage supply line to the electromagnet 35 so that this relay 4** no longer draws current.

The coder consists of a driving motor 26, preferably of very low R. P. M., arranged to drive coding disc 27, preferably of insulating material. The construction of the motor and the coder is more fully described in connection with Figs. 10–12. When disc 27 revolves, studs 28, if arranged with proper spacing, close coding contacts 29 in code sequence when the studs strike projection 30.

The closing of contacts 22, 23 or 24, as in case of fire, energizes relay 4 through low-voltage transformer 7 closing contacts 31 thereof, to energize the transmitter 1, as above explained. The subsequent closing of coding contacts 29, by rotation of disc 27 energizes coding relay 5, the contacts of which effectively close the common cathode circuit of tubes 11 and 12 of the transmitter in code sequence, (here shown to be "33") sending from the transmitter high-frequency pulses of a duration equal to the time of closure of the pulse relay contacts. The closure of contacts 22, 23 or 24 also causes bell 39 to ring because it is connected in parallel to the motor. It is usually desirable that this bell be located near the switches 22, 23 and 24, so that an alarm will sound near the point of origin of the signals. It may be secured to the housing 2, if desired.

It will be noted that in accordance with the invention it is proposed that additional detector and coder units will be connected to the low-voltage lines $a$, $b$, $c$, and $d$, and located wherever they may be required. Such additional detecting and coding units are typified by unit 3 and may be assumed to be similar to the line 2. These units may be of such light weight and compactness, comprising only low-voltage circuits, as to be adapted to installation at small expense in many places formerly improperly protected, or not protected, against the outbreak of fire. Such locations include small buildings, boats and aircraft, for example.

When a plurality of coders are connected to the system as above described a confusion of signals might result if originated simultaneously at different locations. For example, a fire caused by a widespread source, such as an explosion, might actuate substantially simultaneously more than one detection thermostat, such as 22 and 23$a$, each connected to a different coder. If the resulting different signals were simultaneously transmitted a signal of some sort would be received and the resulting alarm would thereby indicate a fire, but the coding would be confused and probably unintelligible. Accordingly, automatic lockout means are provided in accordance with the invention by which only one coded signal at a time is transmitted. In other words, if a plurality of thermostats, connected to as many coders, are simultaneously actuated, the coded signals therefrom will be transmitted in sequence singly and not simultaneously. The arrangement by which this result is achieved may be described in connection with Fig. 1. Upon closure of contacts 22, for example, current from low-voltage lines $a$, $b$, is connected to motor 26 through normally closed contacts 38 of motor lock-out relay 37. Low voltage lines $a$, $b$, are connected, respectively, to the terminals of low voltage secondary winding of stepdown transformer 7. It may be assumed that the primary of this transformer is designed to be connected across the 117-volt A. C. power line 19, 20, as shown, and the secondary winding furnishing low-voltage power for the control circuit apparatus is here assumed to be of 6 volts. As a result of the closing of contacts 22, motor 26 immediately rotates, thus turning coder disc 27 as shown by coder 2. When disc 27 was in its normally stationary position, before the mentioned rotation commenced, the cam 40 on the disc was immediately beneath the projection 41 on the central contact leaf. In this initial position contacts 42 were closed, contacts 43 were open, and contacts 38 on relay 37 were closed. Cam 40$a$ and related contact points are shown in this initial position in coder 3 of Fig. 1, but contacts 38$a$ would be closed in corresponding initial position.

Closure of contacts 43 causes current to flow through line $d$ in the low-voltage cable 8, thus energizing the coil of motor lockout relay 37$a$ in coder 3 which opens contacts 38$a$ thereof. It will be noted that the cables 8, 9, and in fact all the control and alarm circuits of the entire system are at low voltage, viz., 6 or 12 volts. This permits simple and inexpensive wiring, readily complying with Underwriters' requirements.

Any other similar coders connected in the system will be similarly connected to line $d$, and their corresponding relay contacts will simultaneously be opened, thus preventing the operation of all other coder motors except the motor of coder 2 which operated first. If, however, during the rotation of code disc 27 of coder 2, the switches 22$a$, 23$a$ or 24$a$ be closed, actuating current will be supplied only to the righthand one of contacts 43$a$, now shown as open, so no actuation of motor 26$a$ will occur. Upon completion of the rotation of disc 27 of coder 2, the cam 40 will break contacts 43 and will close contacts 42, thus breaking the current supply from line $d$, stopping motor 26 and releasing relay 37$a$ in coder 3. This energizes motor 26$a$ causing coder disc 27$a$ to rotate, moving cam 40$a$ away from the illustrated initial position, opening contacts 42$a$ and closing contacts 43$a$. Hence current now flows through the line actuating motor lockout relay 37 of coder 2 which breaks the current supply to motor 26 by opening contacts 38 of relay 37. At the same time motor 26$a$ will continue to rotate until it makes at least one revolution, closing contacts 29$a$ in coded sequence. As illustrated, the code transmitted by disc 27$a$ is "43," and signals thus coded will be emitted by the transmitter through actuation of coding relay 5, as before.

From the foregoing it will be seen that should more than one coder be actuated by the closing of detection switches or thermostats connected thereto, only one coder disc in the system will be permitted to make more than one complete revolution at one time. The result of this automatic control is, as above described, if coder 2 be actuated as by the closing of switch 22, it will continue coding until switch 22 is opened. However, if, meanwhile, and before switch 22 is opened, coder 3 is actuated by reason of switch 22$a$ being closed, coding disc 27 of coder 2 will make only one complete revolution thus transmitting one complete code signal, and will thereafter stop. The term "one complete code signal" as herein employed means the signal or combination or repetition of signals which will result from one complete revolution of the coding disc. Coding disc 27$a$ of coder 3 will then take over and make one complete revolution, transmitting its complete code signal, after which it will stop and coder 2 will again take over and transmit one complete code signal. This procedure of alternate transmission of code signals will continue until either one of the closed switches 22, 22$a$ is opened. In the event that more than two coders are involved in the operation they will all transmit their respective code signals in succession, but not simultaneously, because the different coder and relay mechanisms possess slightly different inertias.

In Fig. 2 is shown a receiving system suitable to be employed in combination with the transmitting system above described in connection with Fig. 1. The receiver is here represented as being enclosed in three shielding housings 44, 45 and 63, respectively, means for connecting the apparatus together being conventionally provided through terminals $e$—$s$, respectively. The receiving system, as shown, comprises fundamentally a main receiver in housing 44 and a duplicate standby receiver in housing 45. The shielded housing or box 63 encloses signal and control apparatus for the receivers as will now be explained.

The receiving apparatus is normally coupled to power lines 19, 20 which are the same lines similarly represented in Fig. 1. From these same power lines, the electric power to energize the receiving apparatus is also drawn. Thus the same power line which provides energizing power for the entire system is also employed to interconnect the transmiters and receivers, thereby functioning also as the signal-carrying conductor. It is not essential, however, that the one line be used for both purposes.

The receiving apparatus represented in casing 44 of Fig. 2 comprises essentially a converter stage including converter tube 46, an intermediate-frequency amplifier stage including amplifier tube 47, and a relay stage including relay tube 48. By way of example, these three tubes may comprise types 12SA7, 12SK7 and 50L6, respectively, although other suitable types of tubes could, of course, be employed. These and other suitable types of tubes are described in RCA Receiving Tube Manual, 1940. The signal input to the converter tube 46 is coupled through transformer 49 to the usual control grid thereof. Assuming that the signal herein employed is of 100 kc., the tuned input circuit $L_3$, $C_4$ to the control grid of tube 46 would be tuned to that frequency. Likewise, the primary circuit of transformer 49, comprising condenser $C_2$, $C_3$ and inductance $L_2$ would also be tuned to 100 kc. Inductance $L_1$ and condensers $C_1$ and $C_3$ together constitute a filter of the nature disclosed in copending application Ser. No. 701,569 of Joseph L. Cassell, filed October 5, 1946, now Patent No. 2,545,259, issued March 13, 1951, and is for the purpose of eliminating transients from the power line. Inductances $L_4$, $L_5$ and condenser $C_5$ constitute the tuning elements of the oscillator portion of the converter stage. In this instance the oscillator may be assumed to oscillate at 556 kc. to convert 100 kc. to 456 kc. which is then amplified by intermediate amplifier 47. The tuned input and output circuits of amplifier tube 47, being of a conventional nature, need not be further described.

The amplified signals at intermediate frequency are impressed upon control grid 50 of relay tube 48. By means of potentiometer $R_1$, connected as shown, the control grid of tube 48 may be biased to cut-off. It is desirable that a radio-frequency bypass condenser $C_6$ be connected across this potentiometer. In the output or anode circuit of relay tube 48 is connected a signaling relay 51, contacts 52 of which are normally open. Condenser $C_7$ is preferably connected in shunt to the coil of relay 51 to prevent chattering of the relay contacts due to ripples in the power supply. By inserting a milliammeter in closed-circuit jack 53, the anode current of tube 48 can be set at zero by adjusting the value of potentiometer $R_1$, this being the normal, no-signal condition.

The necessary D. C. operating potentials to be furnished to tubes 46, 47, and 48 are derived from rectifiers 106 and 107 and their associated filter circuits. These rectifiers may conveniently be of the selenium type, and if connected as shown, furnish both the grid and anode potentials to the tubes. By employing separate rectifiers for the grid and anode circuits, the grid and anode potentials will vary proportionately with changes in line voltage, which is a desirable condition in a receiver of the type here included. Resistor $R_2$ and condenser $C_8$ together constitute a filter to prevent the selenium rectifiers from modulating the incoming signal at the frequency of the power supply. Resistor $R_2$ also serves as a limiting resistor for the charging current through the rectifiers into the smoothing condensers $C_9$ and $C_{10}$.

Cathode heaters 54, 55, and 56 for tubes 46, 47, and 48 are connected in series with current limiting resistor $R_3$ across power lines 19, 20. Also connected in series with the cathode heaters is the actuating coil of a fault-indicating relay 57. Therefore, when the cathode heater circuit is functioning properly, contacts 58 of relay 57 will be held open in the position illustrated, but when that circuit becomes open, as by the burning out of one of the cathode heating elements, contacts 58 will close, connecting trouble indicating lamp 145 across the line. The closure of contacts 58 simultaneously causes current from lines 19, 20 to energize step-down power transformer 59 to the secondary of which the fault alarm bell 60 is connected. Thus, when any one of three cathode heaters fails the alarm bell 60 rings and the trouble lamp 145 is illuminated to indicate the faulty receiver. At the same time standby receiver 45 is automatically connected in the circuit in the manner explained below.

The receiver above described in connection with Fig. 2 operates as follows: A signal pulse transmitted from the transmitter above described in connection with Fig. 1, is received at 100 kc. on power line 20, passed across plug connections *g*, *g*, and is impressed upon filter coil $L_1$. The frequency of this signal pulse is then converted, as above explained, by converter tube 46 to a frequency, in this instance of 456 kc. The pulse at this intermediate frequency is then amplified in tube 47 and impressed upon relay tube 48, which in normal condition has substantially zero anode current. However, because of the characteristics of this tube, the anode current greatly increases when the signal potential is impressed upon control grid 50 thereof, causing actuation of relay 51 which is of a sensitive type, closing relay contacts 52. The closing of contacts 52 connects code bell 61 across the secondary of step-down transformer 62, the primary of which is connected across the 117-volt power circuit 19, 20. Since relay contacts 52 close with each signal pulse, the code bell 61 will ring in code sequence, thus sounding the coded alarm at the desired receiving point. Of course, as many code bells as desired may be connected to ring simultaneously. Furthermore, in accordance with the invention any other type of alarm may be actuated by the pulses at bell 61. For example, this circuit may be connected to the city fire alarm system to provide a coded "headquarters" alarm, or it may cause the actuation of a fire extinguishing mechanism, or it may be connected to the dialing circuit of a telephone system to cause any prearranged telephone bell to ring, for example, all as represented by the line 109.

In the signal control box 63 are connected means for sounding an alarm upon failure of the 117-volt power in the fire exit light circuit 19, 20. To this end, the actuating coil of a power-failure relay 64 is connected across the line 19, 20, so as to be actuated as long as the power is on the line. Upon failure of the power, contacts 65 of this relay close and connect the 6 volt battery 66 to an alarm bell 67 causing it to ring continuously until normal power is resumed in the light circuit. In addition to ringing alarm bell 67, or in lieu thereof, the closing of contacts 65 could readily be arranged to effect any other desired operation, such as the starting of an emergency generator connectible to the line.

As above mentioned, the receiving apparatus represented as enclosed in casing 45 is a substantial duplicate of that shown in casing 44, and it is arranged to be automatically connected upon failure of the receiving apparatus in casing 44. For example, when, as above described, relay 57 is de-energized by failure of the cathode heater circuit, closing contacts 58, not only are the lamp and bell signals energized, but power is connected through plug contacts *h*, *l*, *q*, to receiver 45, thus energizing relay 57*a* and connecting the receiving apparatus in casing 45 in the place of inoperative receiving apparatus 44. The illustrated position of relay 57*a* is, of course, that of deactuation.

The ringing of trouble bell 60 will call the attention of an attendant to the failure of receiver 44 and he will then throw single-pole double-throw switch 108 from the "up" position shown, to the "down" position which will connect the trouble bell circuit to the contact 58*a* of relay 57*a*, thus stopping the ringing of trouble bell 60 because it is now connected to a properly operating receiver. However, upon failure of the cathode heater circuit of receiver 45 the corresponding operation as above explained will take place, and trouble bell 60 will sound and lamp 145*a* will be lighted indicating failure of the received 45.

To provide an alarm at the receiver upon failure of the 117-volt power, a power-failure relay 64 is connected across the line 19, 20. The back contacts 65 of this relay are connected in series with a 6-volt bell 67 and a suitable battery, as shown. Therefore, when the power fails bell 67 will sound continuously until the fault is corrected. Usually bell 67 would be located at a central point, such as the desk of the engineer or of a hotel clerk. In fact all of the receiving apparatus would preferably be placed at such a location and connected to the fire exit light circuit.

Although the type of transmitting apparatus described in connection with Fig. 1 is presently preferred, the invention is not limited thereto, an alternative form of transmitter being diagrammatically shown in Fig. 3. This type of transmitter has certain advantages among which are that it is extremely simple, rugged and dependable.

The transmitting apparatus shown in Fig. 3 is of the quenched spark type and includes a step-up power transformer 68 which may, for example, have an output voltage of say 1500 volts, or more. By tuning the secondary circuit with condensers 70 and inductance 71 to, say 100 kc., and connecting a quenched spark gap 69 across the circuit so as to discharge the voltage built up in the condensers, oscillations at 100 kc. will be established. The resulting oscillating current may be coupled back to the line 72 by placing inductance coil 73 in inductive relation to coil 71. Blocking condenser 74 is connected in series with inductance coil 73 to avoid short-circuiting the line 72; and condenser 75 is shunted across the primary winding of transformer 68 to prevent high-frequency potential differences from developing across that winding.

One advantage of the present invention is that only low signal power is required, so that satisfactory signals will be produced from a transmitter of quite low power. Consequently, the apparatus of Fig. 3 may be small, of reasonably low voltage and of compact design. When the apparatus of Fig. 3 is substituted for the transmitter apparatus of Fig. 1 it is obviously not necessary to employ latch relay 4 in connection therewith because there is no filament or anode voltage supply to be maintained. The coding of the high-frequency output of the transmitter may be effected merely by making and breaking supply line 72 by the coding relay such as designated 5 in Fig. 1, in which event the contacts thereof would be connected in series with the 117-volt light circuit 19, 20 and the line 72.

Figure 4:
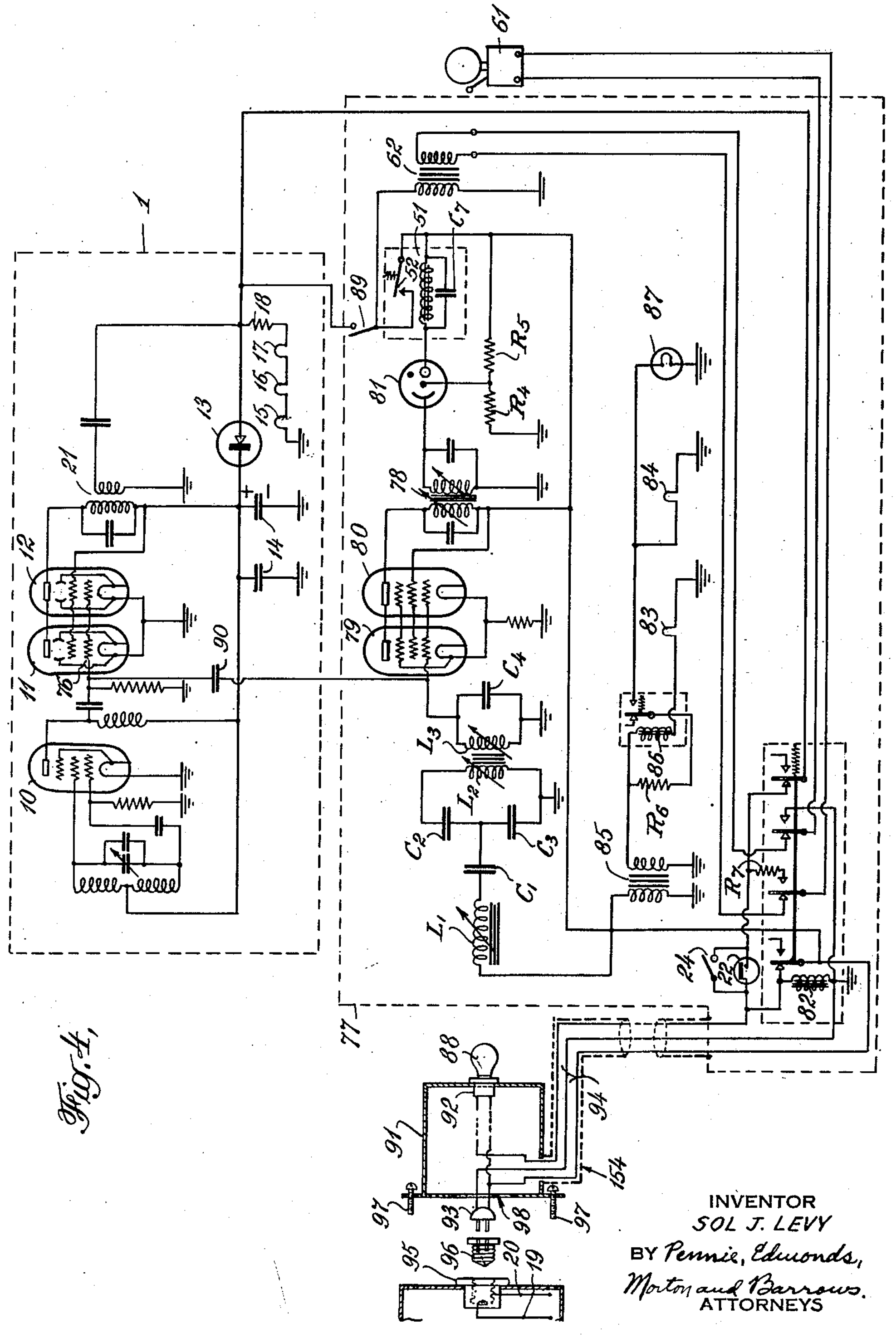
Fig. 4 is a circuit diagram of a simplified modification of the invention adapted for rapid installation even in a system of many units and is arranged for use on a power line in which batteries are employed for standby operation.

In Fig. 4 a modification of the invention is illustrated to show a simplified and very compact alarm system adapted for operation on a fire exit light circuit, for example, which is provided with a low-voltage standby source. In this arrangement the transmitter 1 is essentially the same as transmitter 1 described in connection with Fig. 1 and, therefore, need not here be described again. The receiving and control apparatus represented within shielding housing 77 is in part similar to that of Fig. 2 and in part different. Insofar as the elements thereof are the same as those shown in Fig. 2 they are designated with the same reference characters. In order to simplify the apparatus of the present receiver the superheterodyne principle is not employed, but instead the received signals are amplified at the transmitted frequency. For this reason the sensitivity of the receiving apparatus may be less than that of the apparatus shown in Fig. 2, but if the transmission distance is not too great the present apparatus will prove entirely satisfactory. Furthermore, in accordance with the invention certain modifications permitting "chain" operation assure transmission over any required distance between terminals without the necessity of extremely sensitive apparatus.

The receiving apparatus enclosed in housing 77 includes, as before, a transient filter $L_1$, $C_1$, $C_3$, from which the received signals are impressed on tuned circuits $C_2$, $C_3$, $L_2$ and $L_3$, $C_4$ coupled together. These tuned circuits should all be adjusted to be resonant to the received frequency, here assumed to be 100 kc. It will be noted that input transformer $L_2$, $L_3$ and output transformer 78 are both indicated as being of the iron core and variable inductance type. Such transformers are here chosen because of their compactness which is desirable in this particular modification. Electrically they may be considered to be equivalent to the corresponding coupling transformers represented in the system of Fig. 2. Amplifier tubes 79 and 80 and of the 6BA6 type are connected in parallel and operate one at a time, as below described, to amplify the radio-frequency signals, which, after passing through the tuned circuits of transformer 78, are impressed upon the gas-filled relay tube 81. This relay tube may be of type 1C21, for example, and is of the cold cathode type, but functionally corresponds to relay tube 48 of Fig. 2.

In the output circuit of relay tube 81 a sensitive relay 51, operating on about 5 milliamperes, is connected so as to be actuated by the output current in tube 81 whenever a radio-frequency signal is impressed upon the cathode of that tube from transformer 78. The so-called trigger element of tube 81 is biased to a suitable voltage, here about 50 volts, by voltage divider resistances $R_4$, $R_5$.

Actuation of relay 51 closes contacts 52, as in the system of Fig. 2, and energizes bell-ringing transformer 62 to the secondary winding of which code or alarm bell 61 is connected, provided relay 82 is actuated. Standby relay 82, is, as shown, connected directly across the 117-volt line, and so will be actuated as long as full voltage is present in the line. Thus, whenever a radio-frequency signal is received by receiving apparatus 77, relay 51 and bell 61 will both be actuated, and in code sequence if the signals are coded, although in this simplified modification uncoded signals are recommended.

Connected across the line 19, 20, is a step-down power transformer 85, the secondary of which delivers in this instance, 12 volts. Across the secondary of this transformer are connected in series the winding of relay 86 and the cathode heater 83 of tube 79. Thus, as long as cathode heater 83 is functioning properly amplifier tube 79 will operate. In the event of a burnout of cathode heater 83, relay 86 will be deactuated and cathode heater 84 of amplifier tube 80 will be automatically connected across the secondary of transformer 85 in series with current-limiting resistor $R_6$. At the same time warning lamp 87 will be illuminated to indicate that tube 79 is out of operation.

When the normal 117 volts on the line 19, 20 drops sufficiently, the resulting de-actuation of standby relay 82 disconnects from the line 19, 20 the fire exit lamp 88 and the power input to transmitter 1. At the same time deactuation of relay 82 connects bell 61 in series with the thermostat 22 or other switch 24 directly across the power circuit 19, 20. After failure of the 117 volt power, the alarm bell 61 will ring upon closure of either switch 22 or 24 by reason of fire or by manual operation, as a result of energization of the circuit 19, 20 by a standby battery, as described below in connection with Fig. 5.

Especially when an alarm is initiated manually it is preferable that the person who initiates it should know promptly that the alarm apparatus has functioned. In other words, upon discovering a fire and closing switch 24 of Fig. 4, the person doing so should promptly hear bell 61 commence to ring. For this reason a direct coupling through condenser 90 is provided in the system of Fig. 4 from the input electrode 76 of tube 11 of the transmitter to the input circuit $L_3$, $C_4$ of amplifier tubes 79 and 80. When switch 24, for example, is closed, power is immediately impressed upon the tubes of both transmitter 1 and receiver 77. Tubes 10, 79 and 80 are of the rapid heating type, so oscillator tube 10 and amplifier tube 79 will reach operating condition within two or three seconds, although tubes 11 and 12 would require considerably longer than that to reach operating condition. Therefore, as soon after closure of switch 24 as the tube 10 generates a signal, it will be impressed directly on amplifier 79 which, in turn, will cause actuation of relay 51 as above described, resulting in an immediate ringing of bell 61.

As above suggested, it is assumed that duplicate apparatus of that illustrated in Fig. 4 will be installed in several different loctions in a building, for example. For instance it may be assumed that one complete installation, as shown in Fig. 4, will be made on each of several floors of a building, after the manner illustrated generally in Fig. 5. By use of selector switch 89 it is possible in accordance with the invention to actuate the apparatus either individually or by "chain" operation. When the switch 89 is closed, a signal received on receiver 77 is immediately impressed on transmitter 1 of Fig. 4, which, of course, is also connected to the power line 19, 20. Thus upon receipt of such signal, the signal bell 61 will sound as above described, and simultaneously the signal will be re-transmitted from transmitter 1, it being contemplated that apparatus which is duplicate of that shown in Fig. 4 is connected to the power line 19, 20 on other floors of the building as shown in Fig. 5. The original signal will be automatically re-transmitted from floor to floor with the result that the signal bells on all floors will ring in rotation. In accordance with the system herein shown, the signal bells will all continue to ring until the thermostat or other switch by which the signals were initiated is opened and the selector switches 89 are opened on all of the floors.

The "chain" operation above described is based on the assumption that the radio-frequency signals from each transmitter will be of sufficient power to actuate only the receivers on adjacent floors. In some installations it may be that the signal strength from a given transmitter will be sufficient to actuate receivers further remote for all adjacent floors, so that the chain operation would not be required. When the chain operation is employed, by closing all of the switches 89 on the respective floors, for example, the resulting alarm will be of the continuous type as distinguished from the coded type described in connection with the system of Figs. 1 and 2. This is an inevitable result of the interlocking effect by which the signal received by each receiver is re-transmitted by its associated transmitter. It is evident that when all the transmitters are thus impressing signals on a common communication circuit 19, 20, the signal strength therein will be so great as to assure certain operation of all the receivers and the alarms thereto connected.

A feature of the invention which is disclosed in Fig. 4 (as well as in Fig. 6) and which enhances the ease of installation and portability above referred to is shown at the left of the drawing. This mechanism permits the ready connection of a self-contained unit comprising the apparatus illustrated in Fig. 4 to an existing fire exit light circuit without any change whatever in the wiring or structure of the building. To this end, a metal box or housing 91 is fitted on the front with a lamp socket 92, a standard connection plug 93 and suitable flexible wires interconnecting them as shown. The three connecting wires 94 should preferably be enclosed in an approved form of conduit either rigid or flexible to provide an interconnection between the box 91 and the housing 77. If then the usual exit lamp 88 is removed from the permanent lamp socket 95 and an adaptor 96 is submitted for the lamp by being screwed into socket 95, the plug 93 may then readily be plugged into the adaptor 96. Box 91 is arranged to be closed on all sides except at the bottom 98 where it is open. Adjacent the bottom of the box attachment lugs 97 are provided. This construction permits box 91 to be secured to the standard receptacle box in which socket 95 is secured and thus to replace the original exit light socket with a duplicate thereof together with substantially tamper-proof connections from the fire exit light circuit to the apparatus described in connection with Fig. 4.

The battery standby circuit above referred to in connection with Fig. 4 will more readily be understood by reference to Fig. 5. In order to permit the energization of the fire exit light circuit 19, 20, with a low voltage for emergency operation, it is, of course, necessary to interrupt the normal connection of the standard 117 volt, 60 cycle power supply to that circuit by a switching device which upon failure of the normal power will automatically connect the battery supply. This battery supply is here represented as comprising a 12-volt battery 99 which may advantageously be enclosed in a metal casing 100 together with a standby relay 101. If the coil of this relay 101 is connected directly across the 117-volt power supply as shown, it will remain actuated as long as the 117-volt supply is present. When the relay is thus energized, as shown, the power supply is connected directly to the fire exit light circuit 19, 20. But when the back contacts 102, 103 are closed upon de-energization of the relay, the battery 99 is connected in series with alarm bell 104 across the fire exit light circuit 19, 20. A radio-frequency filter 105 is provided between relay 101 and the 117-volt power supply to prevent spurious operation of the relay 101 and also to block out from the power supply source high-frequency signals impressed on the fire exit light circuit 19, 20. It may be convenient to secure alarm bell 104 to the exterior of the casing 100, and to locate the casing 100 with its associated apparatus at a central station such as near a clerk's desk in a hotel, for example. By referring to Fig. 5 and Fig. 4 together, it will be seen that upon de-actuation of relays 101 and 82, respectively, alarm bell 99 will be connected in series with alarm bell 61 across 12-volt battery 99. Both of these bells, being of the 6-volt type, will ring upon failure of the 117-volt power supply. Referring to Fig. 4, a suitable resistor $R_7$, here of 10 ohms, is arranged to be connected in series with the bell 61 to delay the rush of current through the bell when the 117-volt power supply is resumed and either thermostat 22 or switch 24 is closed. The resistance of $R_7$ is so chosen that in combination with the inductance of the bell the current through the bell does not have time to build up to a destructive value before the resumed line voltage actuates relay 82 thus breaking the direct connection of bell 61 to the line.

The arrangement of Fig. 6 adds to the coded transmitting system of Fig. 1 a battery standby system. Transmitter 1 of Fig. 6 may be assumed to be the same as that described in connection with Fig. 1. Latch relay 4 and coding relay 5 also have the same functions. A standby relay 110 is connected, as shown, across the power line 19, 20. Because the unit comprising the apparatus of Fig. 6 is of a semi-portable nature and readily connected to and disconnected from the power line such as a fire exit light circuit, the coupling box 91 and associated apparatus are intended to be the same as those shown in more detail in Fig. 4.

The primary winding of step-down power transformer 7 is connected at one end, as shown, to one side 19 of the power line. At the other end it is connected to the other side 20 of the power line through contacts 111 of relay 110. Thus when relay 110 is actuated, as will be the case as long as the 117-volt power supply is on, the primary winding of power transformer 7 is energized as in Fig. 1. The secondary winding of the transformer 7 connects to the low voltage lines *a*, *b* of cable 8, as in Fig. 1. This low voltage winding of transformer 7 also is connected to contacts 112, 113 of relay 110. Since the alarm bell 6 is connected to the two moving contacts which cooperate respectively with the contacts 112, 113 connected to the low-voltage "coding" lines *a* and *c*, respectively, the bell will ring whenever a signal pulse, coded or otherwise, is impressed on those lines.

Low voltage connections *c*, *d* to the coding relay 5, and to the latch relay 4 are connected to the low-voltage lines correspondingly marked *c* and *d* of Fig. 1, it being assumed, as above indicated, that the apparatus of Fig. 6 is intended to replace all of the apparatus above the connection points *a*, *b*, *c*, *d* of Fig. 1. When relay 110 is de-energized, as when the 117-volt power fails, contact 111 is opened, disconnecting the primary of transformer 7 from across the power line and connecting bell 6 to contacts 114, 115, of relay 110. In this relay position bell 6 is connected across the line 19, 20 in series with the automatic and manual switches 22 and 24. It is assumed that this power line is equipped with a battery standby circuit, as illustrated in Fig. 5, which would usually be located at a central point. By connecting plug 93, Fig. 6, through adaptor 96 to receptacle 95 of Fig. 5, the standby circuit 100 is connected between the power supply line and the transmitting system. As previously explained, this 6-volt bell (Fig. 5) will then be connected in series with another 6-volt bell, 104, and with 12-volt battery 99 (Fig. 5) when either of switches 22 and 24 (Fig. 1) is closed.

In some installations it is desirable that the alarm be not sounded generally as hereinabove described, but that the original alarm be supervised. For example in some large buildings, such as large hotels or schools, to sound a general alarm as the result of a minor fire readily confined and extinguished might cause unnecessary panic. Under such circumstances it is preferable that the initial alarm be given at a control point, such as at the desk of a clerk, always on duty. If this alarm be coded, as in accordance with the present invention, the clerk may quickly ascertain the location and nature of the fire and then decide whether a general alarm need be given. The system illustrated in Fig. 7 may be operated in this manner.

Figure 7:
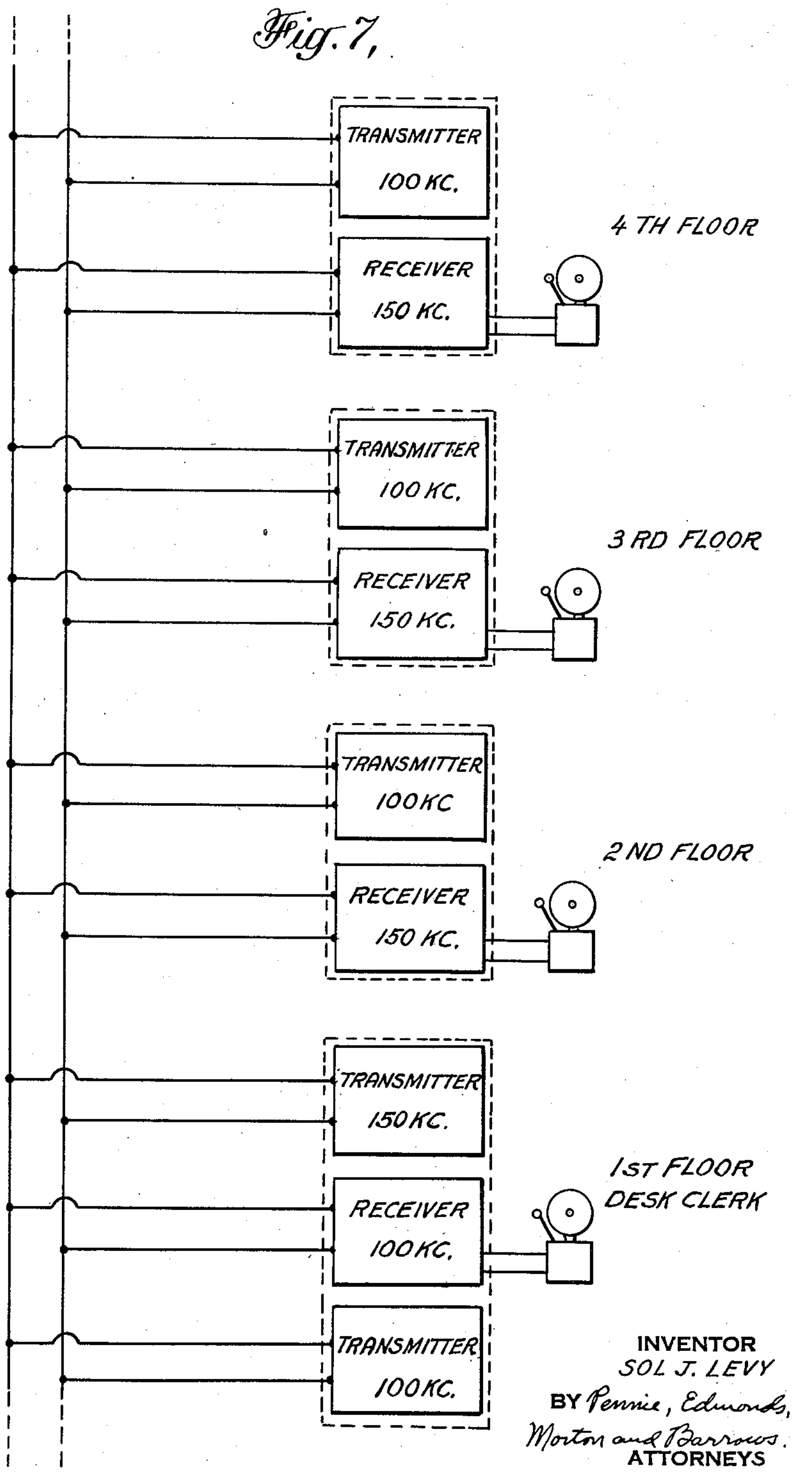
Fig. 7 is a block diagram of a supervised alarm system.

In Fig. 7 transmitting and receiving apparatus is represented in block diagram form as being located on each of four floors, the apparatus on the fourth, third and second floors being identical. For purposes of explanation it may be assumed that each transmitter includes the transmitting, coding and control apparatus described in connection with Fig. 1 and transmits coded signals at 100 kc. The receiving apparatus on the fourth, third and second floors may be assumed to be similar to that described in connection with Fig. 2, except that the tuned circuits of the receiver should in that instance be tuned to say 150 kc. Hence even though all of the mentioned transmitters and receivers are connected to the same fire exit line circuit 19, 20 the receivers will not respond to the mentioned transmitters.

At the clerk's desk on the first floor are also installed a transmitter and receiver similar to those of Figs. 1 and 2 but in this instance, as indicated in Fig. 7, the receiver responds to signals of 100 kc., and the transmitter transmits signals at 150 kc. Thus, when a thermostat switch, for example switch 22 of Fig. 1, connected with the transmitter on the third floor is actuated, the clerk's receiver on the first floor will immediately respond and the alarm bell connected therewith will ring the code. It would be preferable in this instance to connect in parallel with the first floor alarm bell a suitable recording device so that a record would automatically be made of the code number to indicate permanently the original source of the signal or alarm. The desk clerk after investigating the source of the alarm and the nature of the fire, may then, if the conditions demand, send out a general alarm by actuating his transmitter at 150 kc. In the arrangement just described it will be evident that the 150 kc. transmitter need not be arranged to send out coded signals, but that the 100 kc. transmitters on the second, third and fourth floors would preferably include coders. It may be noted that on the first floor there has also been included a 100 kc. transmitter similar to those on the other floors so that the first floor also may be automatically protected.

Figure 8:
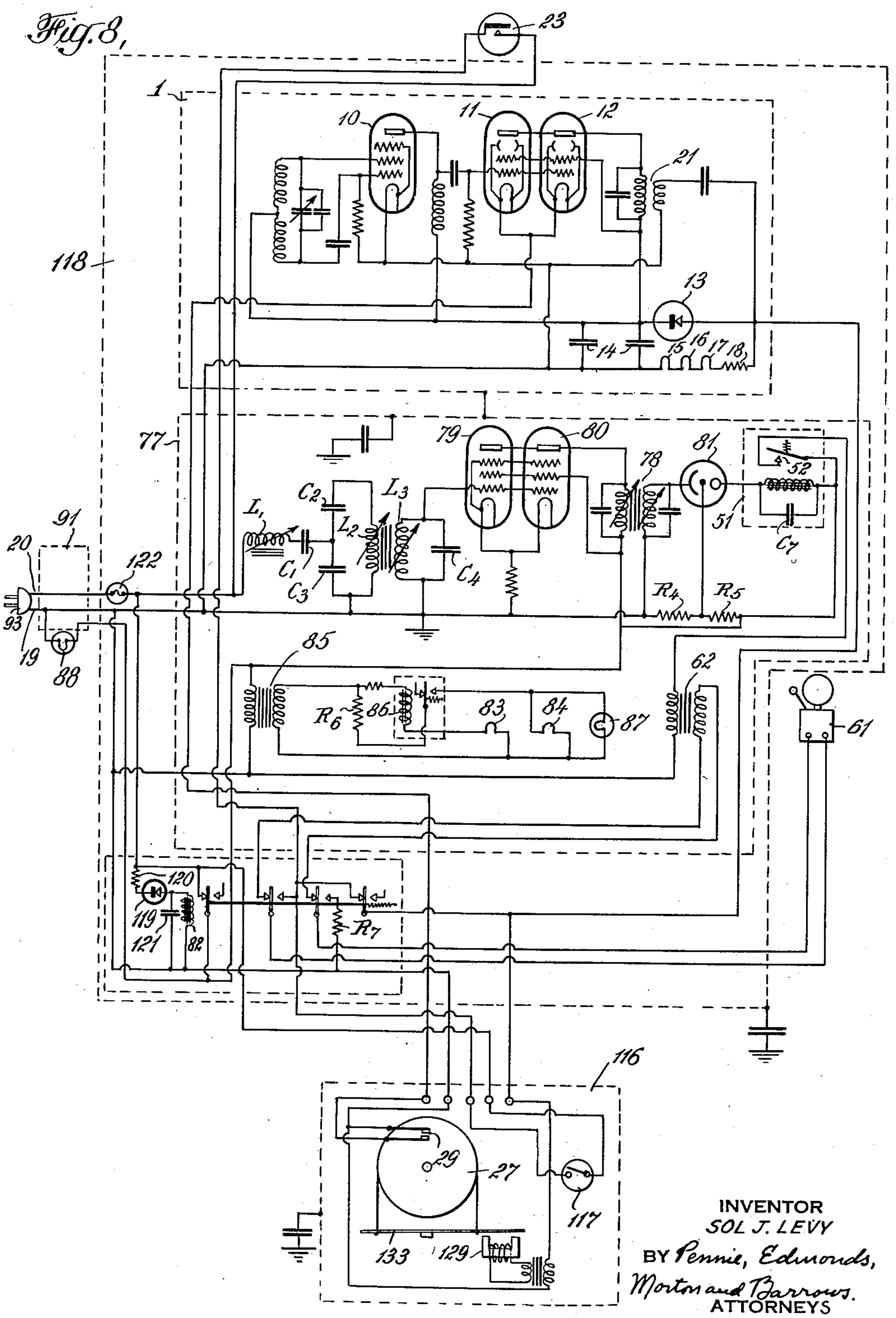
Fig. 8 is a circuit diagram of a simplified complete transmitter, receiver and coder system with battery standby equipment combined as a single unit.

The circuit diagram of Fig. 8 represents a modification of the invention which has wide applicability because it combines in a novel manner many of the most desirable features described in connection with preceding systems. This combination results in an extremely compact and portable structure which may be enclosed in a single housing, if desired.

The transmitter 1 is similar to transmitter 1 of Fig. 1 and thus requires no further description. The receiver 77 is essentially the same as the receiver 77 of Fig. 4 and need not be further described.

Standby relay 82 has here the same function as standby relay 82 of Fig. 4, viz., when the 117-volt supply is on the line 19, 20, the relay is actuated. Here, however, a coder unit 116 is connected through standby relay 82 to transmitter 1 so that as long as relay 82 is actuated the connection of the coder to the transmitter will be essentially the same as shown in Fig. 1. Signal switch 117 may be assumed to represent either of the switches 22 and 24 of Fig. 1. Thermostat switch 23 of Fig. 8 is connected in parallel with switch 117, and although it obviously might be placed in any required location, is here represented as being attached to the top of casing 118 which is represented to enclose all of the apparatus of Fig. 8 except the coder. If desired, the coder as well may be included within the one unit.

To the left of the actuating coil of relay 82 on Fig. 8 are represented a rectifier 119 preferably of the selenium type, a resistor 120 of approximately 30 to 75 ohms, depending on the rectifier characteristics, and a condenser 121 of approximately 4 microfarads, the elements 119 and 120 being in series with the actuating coil of the relay and the condenser being in shunt thereto. These elements are included for the following reason:

It has already been pointed out that in connection with the system of Fig. 8 a battery source for standby operation is intended to be provided as shown in Fig. 5. Under these conditions a large number of standby relays such as 82 may be employed in as many units similar to that of Fig. 8, all connected to the power line 19, 20. The resultant effective resistance of these parallel-connected relay coils may be so low as to cause bell 104 to ring, or at least to be a constant drain on battery 99 of Fig. 5. Accordingly, the relay and filter arrangement shown in Fig. 8 is provided to permit operation of one or more relays 82 in response to the 117-volt alternating current and yet to comprise a very high direct-current resistance to the line. For example, in the arrangement illustrated the effective D. C. resistance of the relay 82 and its filter and rectifier elements is about ½ megohm. To this end the coil winding of relay 82 is of the high resistance D. C. type. The rectifier 119 in series with winding 82 permits D. C. voltage to flow through the coil if battery 99 (Fig. 5) is correctly polarized, and also permits the positive half-cycles of the A. C. current to flow. However, the potential drop through rectifier 119 is considerable so that the coil 82 would not receive full potential were it not for the provision of shunt condenser 121 which raises the effective potential across the coil. The current-limiting resistor 120 is provided to limit the current through rectifier 119 which would tend to flow through the series circuit on the positive peaks when alternating current is used. These high current peaks are due to the normal charging current of the condenser 121 which is of high capacitance.

The fuse 122 represented as connected in the line 20, provides the important function of giving an indication of any fault occurring in the receiver which results in a current overload. A fuse located in the position shown, if it blows, will extinguish the fire exit light 88 thus providing an easily recognized indication of a fault which may then be ascertained and corrected. The elements associated with the fire exit light connection box 91 are the same as those of Fig. 6, which in turn are the same as those shown in more detail in Fig. 4.

Figure 9:
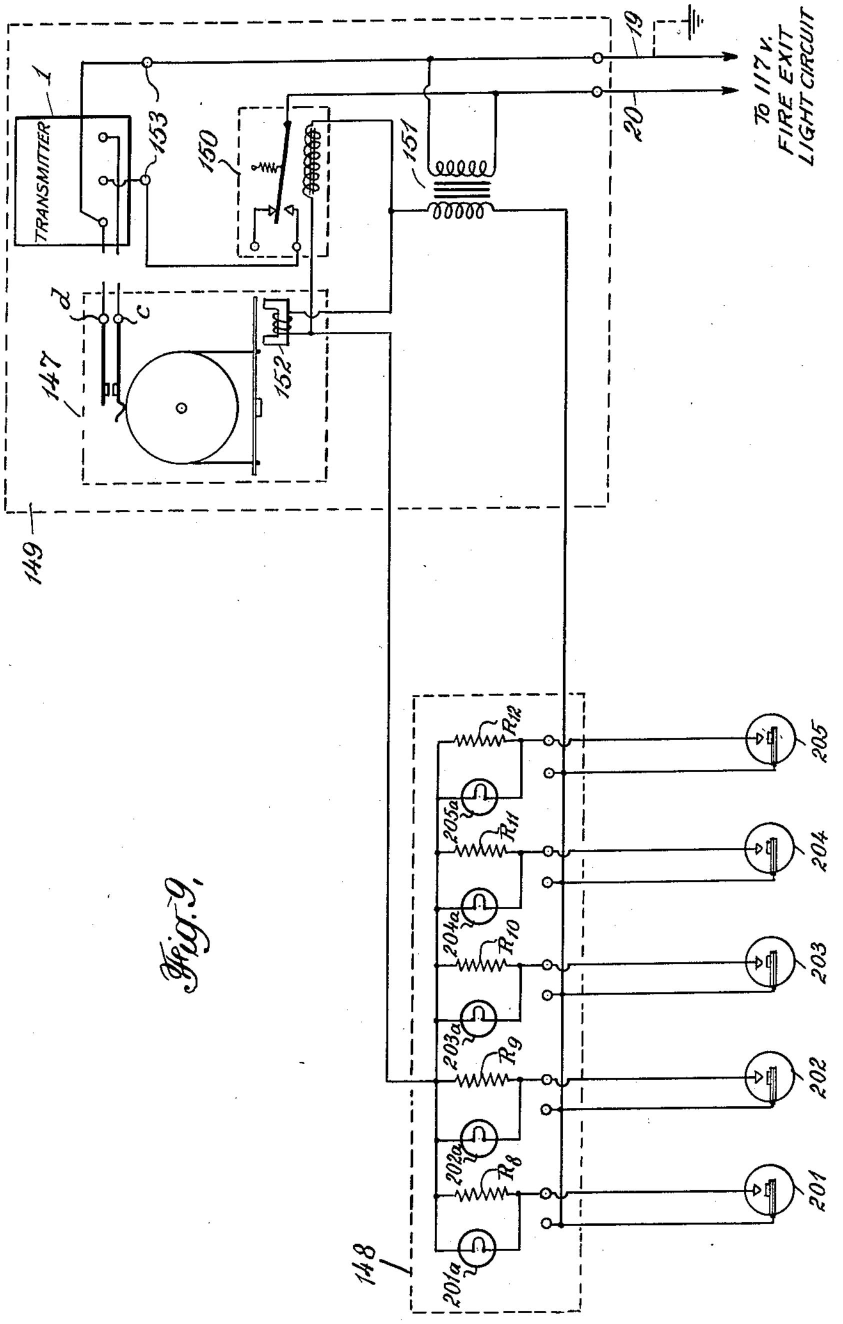
Fig. 9 is a circuit diagram of a simplified modification of transmitter system.

The circuit arrangement of Fig. 9 is a simplification of the systems of Figs. 1 and 8 which employ coders to determine the exact locations of the signal switches at which the alarms are initiated. On the other hand, the system of Fig. 4 comprises alarm transmitting and receiving apparatus simplified to the extent of omitting the coding mechanism entirely.

The modification of Fig. 9 permits an indication or identification of the switch which initiates the alarm signal but without using a separate coder for each switch or block of switches, as in the preceding arrangements. Referring to the figure, there is represented a coder 147, which may be assumed to be similar to the coder 2 of Fig. 1 or the coder 116 of Fig. 8, connected to a signal transmitter 1 as in Figs. 1 and 8. Signal-initiating switches 201 to 205, inclusive, are assumed to be located in various rooms in a hotel, for example, from where an alarm may be sent. Although these switches are represented in the drawing as being of the automatic thermostat type they may comprise any suitable automatic or manual type, connected singly or in blocks, as heretofore described. The switches are connected, respectively, in series with corresponding signal lamps 201*a* to 205*a*, inclusive, so that a lamp will light as long as a switch is closed. These lamps should preferably be mounted on a panel 148 centrally located, as in a hall, and should be marked with room numbers or other designations of the switch locations. If a more permanent record of the switch location is desired, annunciators of the well known "drop" type, or the equivalent, may be substituted for the signal lamps, so that the indication will remain until manually reset, even after the signal switch is opened again.

Near the panel 148, preferably close to a fire exit light receptacle, a casing 149 may be installed to house the coder 147, a relay 150, a step-down transformer 151 and the signal transmitter 1. In this manner the mentioned apparatus may readily be connected to the exit light circuit as described in connection with Fig. 4. From the diagram of Fig. 9 it will be seen that the coder motor 152 and the winding of relay 150 are connected in parallel with each other and in series with each signal lamp and its associated switch across the secondary winding of transformer 151. Thus the coder motor and relay will be actuated by a low voltage whenever a signal switch is closed. Each of resistors $R_8$ to $R_{12}$ connected across an indicator lamp provides a shunt path to the motor and relay in event of lamp burnout, and also provides a lower resistance than the lamp to pass sufficient current for the motor and relay.

The contacts of relay 150, when closed by actuation of the relay, connect transmitter 1 to the 117-volt power line, as in the previous arrangements. If this relay be of the latch type, as in Fig. 1, the transmitter will remain in actuation until the relay is manually reset. Again, if it be desired that the coder, as well as the transmitter, continue in operation indefinitely when once started, the motor 152 may be connected to the secondary of a step-down transformer of which the primary is connected to points 153 in the 117-volt power circuit, it being assumed, in that event, that relay 150 is of the latch type.

The coding circuit of coder 147 has been omitted to simplify the drawing, but it may be the same as that of Fig. 1 or 8. Also omitted from the diagram is a coding bell, such as 39 in Fig. 1, which would preferably be included with coder 147.

From the foregoing description it will be understood that if any of the signal switches, such as switch 202 which may be assumed to be in hotel room No. 202 for example, is closed, the coder 147 will be actuated, as will also the associated transmitter 1, and the lamp or annunciator 202*a* on panel 148 at a central point, such as the hall. Immediately, therefore, a code bell will sound at the receiving station such as the clerk's desk of the hotel where suitable receiving apparatus as shown in preceding figures is installed, indicating the location of the floor as being the second floor, but not indicating the number of the room on the floor from which the signal was initiated. Therefore, someone will be dispatched to the second floor, and by a glance at the indicator panel 148 will learn that the signal originated in room 202.

The principle of the simplified modification of my invention just described in connection with Fig. 9 will obviously be subject to a wide variety of applications because it provides an exact identification of the switch from which the alarm signal originates without use of a separate coder with its associated mechanism for each such switch.

The mechanical construction of the coding apparatus represented in Fig. 1 as coder units 2 and 3, in Fig. 8 as coder unit 116, and in Fig. 9 as unit 147, is shown in detail in Figs. 10, 11 and 12. Fig. 10 represents a plan view of a coder unit with the cover 123 of the unit removed. On a metal base-plate 124 is mounted a disc 27 of insulating material having evenly spaced tapped holes 125 arranged on a circle near the edge thereof. Suitable studs, such as round head screws 28, are placed in appropriate holes so spaced as to constitute the desired code as previously explained. The screws shown in the drawing are arranged to constitute the code number 33—42. Disc 27 is pivoted at its center to rotate parallel to the base plate to which it is secured by axle screw 126. Around the peripheral edge of disc 27 is a shallow groove 127 by which it is driven.

Disc 27 just described is actually a part of the driving motor 26 it being the only rotating part thereof. This motor also comprises an electromagnet winding 128 designed for operation on 6 volt, 60 cycle, alternating current. The U-shaped core 129 of this electromagnet is secured to the base plate 124 by two screws 130, 131 which pass through suitable holes in the core. Screw 130 acts as a pivot and screw 131 as a clamping screw, because the hole through which it passes is arc-shaped, permitting a slight angular adjustment of the entire electromagnet around the pivot 130. Motor 26 is connected in the circuit, as shown in Fig. 1 for example, by means of connection leads 132 (Fig. 12).

A flat steel spring or reed 133, approximately ½ inch in width, is secured near its left-hand end, as shown in the drawing, to a post 134 supported vertically from the base plate 124. This reed is, therefore, free to vibrate on each side of post 26 which acts as a fulcrum. A thin flexible cord 135, preferably of woven fine bronze wires, passes around the periphery of disc 27 in groove 127 thereof. The ends of this cord 135 are secured, respectively, in suitable holes drilled in the reed along a line passing through the center thereof. This cord should be drawn fairly tight before being secured to the reed and may, of course, be fastened thereto in any suitable manner. It will be seen from the drawing that the center of the post 34 with its attachment to the reed 133 is on a line with the axis of disc 27, and that the respective ends of cord 135 are spaced apart a distance equal to the diameter of the groove 127. The drawing also shows that the longer free end of reed 133 is positioned in magnetic relation to the open end of core 129 of electromagnet 128 so as to be attracted thereto when the electromagnet is energized. If now, the winding 128 is energized by alternating current the ends of reed 133 will vibrate at twice the frequency of the alternating current, and at each vibration of the reed the disc 27 will be rotated a short distance in the direction of the arrow. The increments of motion of the disc are so short and so rapid that it appears to, and effectively does, rotate continuously. Furthermore, when the current is turned on and off, the motor starts and stops with no lag. Although any other type of suitable motor could be substituted, the one presently described is of great simplicity and reliability and may readily be arranged to rotate at the desired slow speed without any gearing or other speed-changing mechanism. The speed, and to some extent the power, of the motor described may be adjusted over a small range by changing the magnetic gap between the free end of the reed 133 and the pole faces of core 129. Such change in spacing may be effected as above indicated by rotating the entire electromagnet around the axis 130 and clamping it in the adjusted position by means of clamping screw 131.

There are two sets of contact members associated with disc 27, the electrical functions of which have previously been described in connection with Fig. 1. The coding contacts 29 are secured in the usual manner to two contact springs 136 and 137, the longer one, 136, of which is bent downward at the end so as to be raised by screw heads 28, as can be seen more clearly in Fig. 10. Thus the contacts 29 are closed whenever the spring 36 is raised by passing over a screw head 28.

The other set of contacts 42, 43 are shown more clearly in Fig. 10, being also secured to suitable contact springs in the usual manner. These springs are arranged at 90 degrees to springs 136 and 137, as shown in Fig. 10. Central spring 138 is considerably longer than the other two, and is bent at the end to form a projection 30 which cooperates with cam 40. This cam comprises a curved piece of insulating material secured to the under face of disc 27. Thus once each revolution of disc 27 contact spring 138 will be moved outwardly from the periphery of the disc, opening contacts 43 and closing contacts 42, as shown in Fig. 10, and also in Fig. 1.

The motor lockout relay 37 which was described in connection with Fig. 1 is shown in Fig. 10 as secured to the base plate 124. This relay is conveniently located in the position shown, but may obviously be placed wherever desired. Also secured to the base plate 124 is a thermostat 139, the heat-actuated contacts 22 of which are represented in Figs. 1, 4 and 6. As a matter of convenience in installation, it is desirable that one such thermostat be secured to the coder unit, but as above explained, additional thermostats should be placed wherever required.

In Fig. 11 is illustrated a mechanical arrangement of certain elements of the invention which were referred to in connection with the description of Fig. 1. In describing that system it was mentioned that a container 25 of fire extinguishing fluid may be suspended from a suitable hook attached to the signal switch 24. The modification illustrated in Fig. 11 is for the same purpose as the arrangement previously referred to, but differs therefrom in certain respects. Here the corresponding container 146 of fire extinguishing fluid, is fitted with a metal link 140 secured to the top member 141 of the container. This top member seals a large hole in the top of the container 146 by means of a readily fusible material so that the container will fall away from the top member 141 in the presence of a predetermined degree of heat. Link 140 which is secured to the top member 141 is pinned to arm 142 of switch 24 by means of a fusible pin which also passes through a rigid strut 144 supported perpendicularly at its foot to base plate 124. Therefore, when pin 143 is passed through aligned holes in members 140, 142 and 144, these three members will be locked together so that the container 146 hangs therefrom, and switch arm 142 is retained in the position shown in solid lines. However, when a predetermined temperature softens the fusible material of which the pin 143 is formed, the pin will melt, permitting the spring-actuated switch arm 142 to move outwardly to the position shown in dotted lines. At the same time the container 146 will fall down, and the top member 141 will be released as above described, spilling out the contents of the container.

It will be understood from the foregoing that switch 24 is of the well-known type of spring-actuated switch of which the contacts are closed when the contact arm assumes the position shown in dotted lines, and of which the contacts are held open against the pressure of the spring when the arm is retained in the position shown in solid lines. If desired, the container may be hinged at the bottom to the wall or to a continuation of base plate 124, so that when the fusible pin 143 melts the container will swing outwardly and turn upside down. To assure this movement of the container a suitable spring may be placed between the wall and the back of the container near the top thereof, to urge it outwardly.

What is claimed is:

1. In a coded alarm system including a signal transmitter, a plurality of motor-driven coding devices adapted to cyclically code the signals transmitted, and a plurality of alarm switches connected to start the motors, the improvement which comprises, a lockout relay for each motor, each relay having an actuating coil and a pair of contacts connected in series with its respective motor for controlling the operation thereof, a lockout circuit connecting the actuating coils of all of said lockout relays in parallel, and switching means actuated by each of said coding devices and so connected to said circuit that upon the starting of a first coding device by closure of an alarm switch connected to a first motor coupled thereto the lockout relay associated with said first motor remains unactuated and the lockout relays connected to the remaining motors are actuated to disconnect the motors respectively associated therewith, and to so remain until completion of the coding cycle of the coding device first actuated.

2. A coded alarm system according to claim 1 wherein each coding device comprises a moving coding member fitted with a cam, a contact device operable by said cam and comprising a central contact leaf and two lockout contact members cooperating therewith such that when said leaf is raised by said cam the first lockout contact is open and the second lockout contact is closed, an electric power source for operating said relays, a connection from said central leaf to one side of said lockout circuit, a connection from said first lockout contact to one terminal of the motor, a connection from said second lockout contact to one terminal of the actuating coil of said lockout relay, and a connection from the other terminal of the actuating coil of said lockout relay to a first side of said power source, said alarm switch being connected between the second side of said power source and said first lockout contact, and the other terminal of said motor being connected through the contacts of said lockout relay to said first side of said power line.

3. In an electric alarm system, two substantially identical radio-frequency signal receivers, including electron tubes of the cathode heater type, an electric power line connectible to energize said receivers, radio-frequency coupling means for coupling said power line to the signal inputs of said receivers, first and second relays each having a back contact, a cathode heater circuit for each receiver, the cathode heater circuit of the first of said receivers including the cathode heaters of the tubes of that receiver and the winding of said first relay connected in series across said power line, the cathode heater circuit of the second of said receivers comprising the winding of said second relay connected in series between the back contact of the first relay, the cathode heaters of the tubes of said second receiver and one side of said power line, the moving contact of said first relay being connected to the side of said power line to which the winding of that relay is connected, the moving contact of the second relay being connected to the side of the winding of that relay which is connected to said back contact of the first relay, a signaling device and an actuating circuit therefor, and the back contact of said second relay being connectible to said actuating circuit, whereby upon failure of said first receiver, said second receiver will be automatically connected to the power line, and upon failure of said second receiver said device will automatically be actuated.

4. In a radio-frequency alarm system, a radio-frequency signal receiver connectible to a power line for receiving radio-frequency signals and low-frequency actuating power therefrom, said receiver comprising a radio-frequency signal amplifier including two amplifying tubes having parallel-connected anodes and cathodes provided with alternating-current heaters, the signal input of said amplifier being coupled to said power line, a first relay having an actuating coil coupled to the output of said amplifier, signaling means connected to be actuated by said relay, a second relay having a moving contact and a back contact, a source of heating current derived from said power line, a connection from said source of heating current through the coil of said second relay and the cathode heater of a first of said tubes, a connection from said moving contact to said current source, and a connection from said back contact to the cathode heater of said second tube, whereby said second amplifier tube will automatically be connected into operation upon failure of the cathode heater of said first tube.

5. In a radio-frequency alarm system, a radio-frequency signal receiver connectible and means for coupling said receiver to a power line for receiving radio-frequency signals and low-frequency actuating power therefrom, said line being connectible to a power source, a first signaling device located remotely from said receiver, a second signaling device located near said receiver, a battery, first and second standby relays having moving and stationary contacts and having actuating coils connected effectively across said power line, contacts of said first relay connected to said first signaling device, to said battery and to said power line such that when said first relay is actuated the power from said source is connected to said line and thence to said receiver, but when power from said source is discontinued said first signaling device and said battery are connected to said line, and connections from the contacts of said second relay to said second signaling device and to said line such that when power from said source is discontinued said second signaling device is also connected to said line, whereby upon discontinuance of said power both signaling devices will be actuated by said battery.

6. In a radio-frequency alarm system, a radio-frequency signal transmitter, a radio-frequency signal receiver and means for connecting said transmitter and said receiver to a power line which is coupled to a low-frequency power source to receive actuating power therefrom and so as to impress radio-frequency signals on said line and to receive them therefrom, respectively, a standby power source, relay means interposed in said power line between said source and said transmitter and said receiver automatically operative to connect said standby power source to said line upon discontinuance of said low frequency source, signaling means associated with said receiver actuated by said standby source, and means automatically connecting said signaling means to said line and hence to said standby source upon discontinuance of said low-frequency source.

7. In a radio-frequency alarm system, a radio-frequency signal receiver and means for coupling said receiver to a power line which is adapted to be coupled to a low-frequency power source to receive actuating power therefrom and so that said receiver may receive radio-frequency signals from said line, a standby power source, relay means interposed in said power line between said source and said receiver automatically operative to connect said standby power source to said line upon discontinuance of said low-frequency source, signaling means associated with said receiver actuated by said standby source, and means automatically connecting said signaling means to said line and hence to said standby source upon discontinuance of said low-frequency source.

8. In an alarm system according to claim 7, a current-limiting element, and contact means on said relay means connecting said element in series with said signaling device in standby position only, said element being proportioned with the impedance of said device to provide a time constant greater than the operating time of said relay means so that upon resumption of said power source said element will restrict the current through said device to a safe value before said relay is actuated to disconnect said device.

9. In a radio-frequency alarm system, a signal transmission line, a radio-frequency signal transmitter including an oscillator comprising a vacuum tube of fast-heating type and an amplifier comprising a vacuum tube of slow-heating type, the output of said oscillator being coupled to the input of said amplifier and the radio-frequency output of said amplifier being coupled to said line so as to impress high-amplitude signals thereon for distant transmission, a radio-frequency signal receiver including a radio-frequency amplifier, a signaling device and relay means coupling said signaling device to the output of the amplifier of said receiver, means coupling the signal input of said receiver to said line so as to impress on said receiver radio-frequency signals received from said line, and radio-frequency signal coupling means connected between the output of said oscillator and the input of the amplifier of said receiver, whereby said signaling device may be actuated directly in response to signals from said oscillator as a confirmation of initiation of an alarm before said tube of slow-heating type has become operative to transmit the alarm to a distant point.

10. In a radio-frequency alarm system, a low-frequency power line, and a plurality of transmitter-receiver units connected to said line at separated points so as to receive low-frequency operating power therefrom and to transmit to and receive from said line signals of effectively a single radio frequency, a plurality of signaling devices connected to be actuated, respectively, by the signal outputs of the receivers, and a signal switch in each said unit serving to connect the signal output of the receiver thereof to the signal input of the transmitter thereof, whereby with said switches closed signal initiated at any of said units will be received by and will be re-transmitted by all others of said units of which said switches are closed, to actuate said devices of said last-named units substantially simultaneously.

11. In a radio-frequency alarm system, a low-frequency power line, and a plurality of alarm signal units disposed at separated stations and connected to said line so as to receive operating power therefrom and respectively to transmit to and receive from said line radio-frequency signals, each said unit comprising a radio-frequency signal transmitter including coupling means for coupling the radio-frequency signal output of said transmitter to said line, a radio-frequency signal receiver including transient-filter coupling means for coupling said line to the radio-frequency signal input of said receiver, a signaling device, relay means operable in response to signals from said receiver and connected to actuate said signaling device, and a standby relay having an actuating coil connected to said line, a high resistance element serially connected between said coil and said line, an alarm switch, and contact means on said standby relay operable when said standby relay is actuated to couple said signaling device to the signal output of said receiver and when deactuated to connect said switch and said device in series to said line at a point on the line side of said element.

12. In combination with a system according to claim 11, a normal source of operating power connectible to said line, a power-control relay having an actuating coil connected to said source of power, a standby power source capable of operating said signaling device, and contact means on said power-control relay for automatically connecting said standby source to said power line upon failure of said normal source.

13. An alarm system as defined in claim 11 wherein said power line normally carries alternating current and for standby operation carries direct current, and said standby relay is of the high-resistance direct-current type, a rectifier and a current-limiting resistor connected in series between said power line and the actuating coil of said standby relay, said rectifier being of such high resistance as to limit direct current through said actuating coil to a value insufficient to actuate said relay, and a condenser connected in shunt to the actuating coil of said standby relay of a capacitance sufficient to increase the effective direct-current operating potential impressed on said coil to an operative value.

14. In a coded alarm system, a radio-frequency signal transmitter, an automatic signal coding device having coding contacts, a radio-frequency signal receiver, a high voltage A. C. power line, a step-down transformer energized from said power line and having a low-voltage secondary winding, power connections from said transmitter and receiver to said power line for energizing the same, a coding relay having contacts connected to said transmitter so as when actuated to code the transmitted signals, radio-frequency signal-carrying means coupling the signal output of said transmitter to said power line whereby radio-frequency signals may be transmitted over said power line independently of the power therein, radio-frequency signal-carrying means coupling said power line to the radio-frequency signal input of said receiver, and switching means in circuit with said low-voltage winding and said coding device to initiate actuation of said device upon closing of said switching means, said coding contacts being in circuit with said low-voltage winding and said coding relay so as to actuate said coding relay upon closure of said coding contacts whereby said relay, switching means and contacts are all connected in low-voltage circuits, a latch relay having two contacts closed by release of a latch, and a latch-release coil, said latch relay contacts being connected in circuit with said power line and said transmitter so as to energize the same upon closure of said latch relay contacts, and said latch release coil being in circuit with said low-voltage winding and said actuating contacts associated with said coding device, whereby upon actuation of said coding device said release coil is energized, releasing said latch and closing said latch relay contacts so as to connect said transmitter to said power line continuously until said latch relay is reset.

15. In an electric alarm system, two substantially identical radio-frequency signal receivers, including electron tubes of the cathode heater type, an electric power line connectible to energize said receivers, radio-frequency coupling means for coupling said power line to the signal inputs of said receivers, first and second relays each having a back contact, a cathode heater circuit for each receiver, the cathode heater circuit of the first of said receivers including the cathode heaters of the tubes of that receiver and the winding of said first relay connected in series across said power line, the cathode heater circuit of the second of said receivers comprising the winding of said second relay connected in series between the back contact of the first relay, the cathode heaters of the tubes of said second receiver and one side of said power line, the moving contact of said first relay being connected to the side of said power line to which the winding of that relay is connected, the moving contact of the second relay being connected to the side of the winding of that relay which is connected to said back contact of the first relay, a signaling device and an actuating circuit therefor, a single-pole double-throw switch, and a step-down power transformer having a primary winding and a secondary winding of which the primary winding is connected on one side to said power line and on the other side to the moving arm of said switch, said signaling device being connected across the secondary winding of said transformer, one contact of said switch being connected to the back contact of said first relay and the other contact of said switch being connected to the back contact of said second relay, whereby upon failure of said first receiver said signaling device will be actuated and said second receiver will be automatically connected to the power line, and, after operation of said switch and upon failure of said second receiver said signaling device will automatically be actuated.

SOL J. LEVY.

REFERENCES CITED

The following references are of record in the file of this patent:

UNITED STATES PATENTS

| Number | Name | Date |
|---|---|---|
| Re. 20,282 | Bernarde | Mar. 9, 1937 |
| 335,223 | Hexamer | Feb. 2, 1886 |
| 1,075,314 | Flagg | Oct. 7, 1913 |
| 1,084,780 | Beach | Jan. 20, 1914 |
| 1,497,194 | Norden | June 10, 1924 |
| 1,613,018 | Butler | Jan. 4, 1927 |
| 1,629,337 | Garrett | May 17, 1927 |
| 1,885,309 | Wagner | Nov. 1, 1932 |
| 1,927,681 | Clemence | Sept. 19, 1933 |
| 1,950,108 | Harrington | Mar. 6, 1934 |
| 1,954,794 | Beach | Apr. 17, 1934 |
| 1,983,449 | Frank | Dec. 4, 1934 |
| 2,022,991 | Walter | Dec. 3, 1935 |
| 2,036,330 | Harrington | Apr. 7, 1936 |
| 2,109,273 | Muether | Feb. 22, 1938 |
| 2,141,551 | Phinney | Dec. 27, 1938 |
| 2,149,200 | Wheelock | Feb. 28, 1939 |
| 2,183,245 | Muether | Dec. 12, 1939 |
| 2,270,771 | Schonfeld | Jan. 20, 1942 |
| 2,289,517 | Muether | July 14, 1942 |
| 2,307,771 | Denton | Jan. 12, 1943 |
| 2,356,364 | Tice | Aug. 22, 1944 |
| 2,387,444 | Hayslett | Oct. 23, 1945 |
| 2,399,738 | Howe | May 7, 1946 |
| 2,411,612 | Boyajian | Nov. 26, 1946 |